United States Patent [19]
Dagdeviren

[11] Patent Number: 5,999,564
[45] Date of Patent: Dec. 7, 1999

[54] SYSTEM AND METHOD FOR ITERATIVELY DETERMINING QUANTIZATION INTERVALS OF A REMOTE ADC AND MODEM EMPLOYING THE SAME

[75] Inventor: Nuri Ruhi Dagdeviren, Red Bank, N.J.

[73] Assignee: Lucent Technologies, Inc., Murray Hill, N.J.

[21] Appl. No.: 08/829,274

[22] Filed: Mar. 31, 1997

[51] Int. Cl.$^6$ ................................ H04B 1/38; H04L 5/16
[52] U.S. Cl. ......................... 375/222; 375/219; 375/221
[58] Field of Search .................................. 375/222, 221, 375/219, 243; 370/249; 379/93.05, 93.06, 93.07; 371/30, 34, 37.9

[56] References Cited

U.S. PATENT DOCUMENTS

| | | | |
|---|---|---|---|
| 5,394,437 | 2/1995 | Ayanoglu et al. | 375/222 |
| 5,406,583 | 4/1995 | Dagdeviren | 375/5 |
| 5,528,625 | 6/1996 | Ayanoglu et al. | 375/222 |

*Primary Examiner*—Stephen Chin
*Assistant Examiner*—Phuong Phu

[57] ABSTRACT

For use with a central communications device digitally-coupled to a digital telecommunications network that includes an analog interface having an analog-to-digital converter ("ADC"), a system and method for iteratively determining quantization intervals of the ADC and a modulator/demodulator ("modem") employing the system or the method. The system includes: (1) a signal generator, coupled to an input of the ADC, that generates a sequence of analog signals to be quantized by the ADC to yield resulting symbols for reception into the central communications device and (2) an analyzer, that receives a return signal from the central communications device, the return signal indicating comparisons by the central communications device of the resulting symbols with expected symbols, the comparisons allowing the analyzer to determine threshold values between the quantization intervals of the ADC, the quantization intervals being a function of the threshold values.

26 Claims, 3 Drawing Sheets

SYSTEM AND METHOD FOR ITERATIVELY DETERMINING QUANTIZATION INTERVALS OF A REMOTE ADC AND MODEM EMPLOYING THE SAME

TECHNICAL FIELD OF THE INVENTION

The present invention is directed, in general, to data communications and, more specifically, to a system and method for iteratively determining the quantization intervals of a remote analog-to-digital converter ("ADC") in an analog interface to a digital telecommunications network, and a modulator/demodulator ("modem") employing the system or the method.

BACKGROUND OF THE INVENTION

The general availability of public access to the Internet has fueled the proliferation of online information services. Virtually every conceivable type of information can now be found "online," including text, graphics, audio, and even full-motion video. The ability to receive, or transmit, the different types of data, however, is often limited by the inability of the network, or a user's modem, to receive or transmit the data at a sufficiently fast enough rate.

For most users, access to the Internet is accomplished by using a modem connected to the public switched telephone network ("PSTN"). Because the original PSTN was an analog system, conventional modems have used analog methods to communicate with remote systems coupled to the PSTN. The original analog PSTN, however, is increasingly being replaced by a digital network. In most regions, the only remaining portions of the network that use analog transmission are the subscriber, or "local," loops that connect each user to a central office ("CO"); each CO using a digital network to communicate with other COs and, more and more, to communicate with central site (e.g., Internet service provider) modems connected to the PSTN via a digital connection. Conventional analog modems, however, view the entire PSTN as an analog system, even though the signals are digitized for transmission throughout most of the network.

When a user calls a central site digitally-connected modem, the analog signals transmitted by the client (i.e., user's) modem are digitized by an analog-to-digital converter in an analog interface to a digital portion of the PSTN. In the United States and Japan, the ADC is called a "mu-law" ($\mu$-law) ADC, named for the technique used to space the analog-to-digital sample points (also called "quantization levels"); in Europe, a different quantization technique, called "A-Law," is typically used. Mu-law is a standard analog signal compression algorithm used in digital communications systems to optimize (i.e., modify) the dynamic range of an analog signal prior to digitizing.

Mu-Law compression is used to optimize the PSTN for traditional voice communications. The wide dynamic range of speech does not lend itself well to efficient linear digital encoding. Mu-law encoding, however, effectively reduces the dynamic range of the signal, thereby increasing the coding efficiency and resulting in a signal-to-distortion ratio that is greater than that obtained by linear encoding. By artificially limiting the sound spectrum to the bandwidth of normal human speech, the network bandwidth required for each call is reduced, thereby increasing the number of potential simultaneous calls. Although this approach works well for voice communications, it imposes significant limitations on data communications.

When a client modem transmits data, it uses a digital-to-analog converter ("DAC") to convert the digital data, or "symbols" representative of the data, into an analog signal. The analog signal is then received and converted back to digital form by a mu-law ADC in the PSTN. If each of the discrete analog signal levels used by the DAC in the client modem is not within the appropriate quantization interval used by the mu-law ADC in the PSTN, however, the transmitted data may not be accurately converted back to digital form by the mu-law ADC. If the mu-law ADC incorrectly converts a transmitted signal, the central site modem will not receive the same data that was transmitted, resulting in communications errors. In some cases, error-checking protocols can detect a communication error and request the client modem to resend the corrupted data. The need to periodically retransmit data, however, can greatly reduce the average data transmission rate, thereby limiting a user's ability to efficiently transmit data.

SUMMARY OF THE INVENTION

The present invention provides, for use with a central communications device digitally-coupled to a digital telecommunications network having an analog interface including an analog-to-digital converter ("ADC"), a system and method for iteratively determining quantization intervals of the ADC and a modem employing the system or the method. The system includes: (1) a signal generator, coupled to an input of the ADC, that generates a sequence of analog signals to be quantized by the ADC to yield resulting symbols for reception into the central communications device and (2) an analyzer, that receives a return signal from the central communications device, the return signal indicating comparisons by the central communications device of the resulting symbols with expected symbols, the comparisons allowing the analyzer to determine threshold values between the quantization intervals of the ADC, the quantization intervals being a function of the threshold values.

The present invention therefore introduces the broad concept of interacting with a central communications device digitally-coupled to a digital telecommunications network to iteratively determine the quantization intervals of an ADC in an analog interface to the digital telecommunications network. By way of the sequence of analog signals and the resulting return signal, the signal generator and the analyzer are able to determine the threshold values between the quantization intervals of the ADC and thereby determine the quantization intervals. A modem employing the system and method can selectively adjust its signaling levels to correspond with the iteratively-determined quantization intervals of the ADC. In this manner, modem communications may be optimized with respect to a remote ADC.

BRIEF DESCRIPTION OF THE DRAWINGS

For a more complete understanding of the present invention, reference is now made to the following descriptions taken in conjunction with the accompanying drawings, in which.

DETAILED DESCRIPTION

The following detailed description relates to a system and method for iteratively determining the quantization intervals of a remote analog-to-digital converter ("ADC") in an analog interface to a digital telecommunications network. In one embodiment, the system and method are employed by a modulator/demodulator ("modem") for communicating with a central communications device that is digitally-coupled to the digital telecommunications network.

Figure 1:
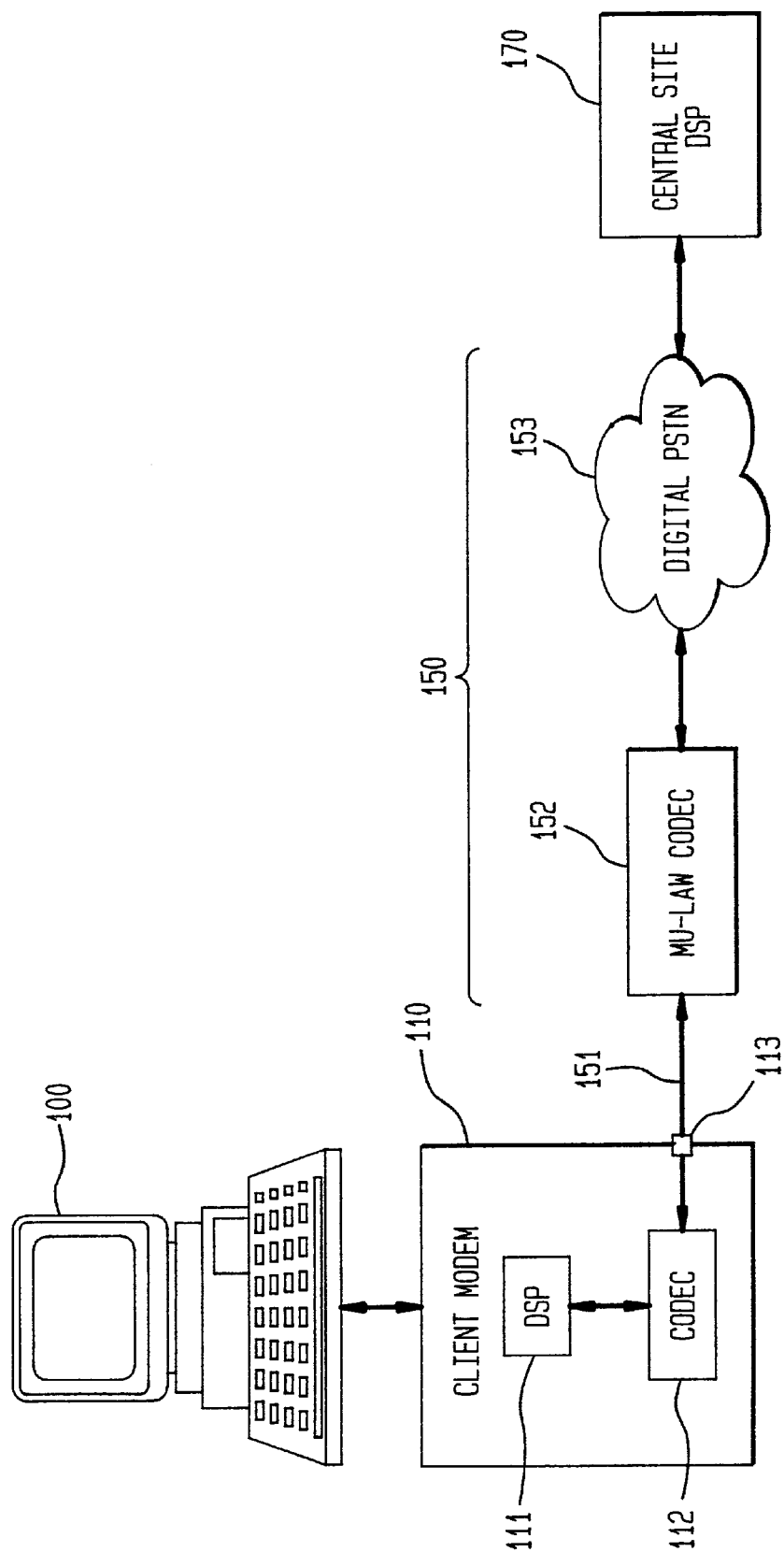
FIG. 1 illustrates a high-level schematic of a modem communicating with a central communications device through a digital telecommunications network.

Referring initially to FIG. 1, illustrated is a high-level schematic of a client modem 110 communicating with a central communications device (or "central site device") 170 through a public switched telephone network ("PSTN") 150. As used herein, "client" generally refers to a device that is coupled to the PSTN 150 via an analog local loop 151, and "central" generally refers to a device that is digitally-coupled to a digital portion 153 of the PSTN 150 for communicating with one or more client devices. Thus, in FIG. 1, a computer 100 is shown coupled via a client modem 110 and an analog local loop 151 to the PSTN 150 for communicating with a central site device 170 that is digitally-coupled to the digital portion 153 of the PSTN 150.

In one embodiment, the client modem 111 includes a digital signal processor ("DSP") 111 and a coder/decoder ("CODEC") 112. The CODEC 112 includes a digital-to-analog converter ("DAC") (not shown) for converting digital signals to analog signals for transmission over analog local loop 151, and an analog-to-digital converter ("ADC") (not shown), for receiving analog signals over analog local loop 151 and converting the signals to digital signals. The CODEC 112 is coupled to an analog local loop 151 of the PSTN 150 by a telephone interface 113. An analog interface in the PSTN 150 includes a mu-law CODEC 152 having a mu-law ADC (not shown) for converting analog signals received over the analog local loop 151 to digital signals for transmission over the digital portion 153 of the PSTN 150.

A mu-law ADC is characterized by quantization intervals that are distributed non-linearly in accordance with the conventional mu-law algorithm; those skilled in the art will recognize that the quantization intervals of the ADC in the CODEC 152 may be distributed according to mu-law or A-law; the present invention may, but is not required to, operate with these or other nonlinear or linear quantization interval distributions.

The mu-law ADC in mu-law CODEC 152 converts analog signals received from the client modem 110 to digital signals for transmission over a digital portion 153 of the PSTN to the central site device 170. In one embodiment, the mu-law CODEC 152 also includes a DAC (not shown)for converting digital signals received over digital portion 153 from the central site device 170 to analog signals for transmission over analog local loop 151 to the client modem 110.

In order to optimize the data transmission rate between the client modem 110 and the central site device 170, via the mu-law CODEC 152, the operation of the client modem 110 is preferably synchronized to the operation of the mu-law CODEC 152; i.e., the respective signaling and sampling times are preferably synchronous. A method of synchronizing the operation of client modem 110 and mu-law CODEC 152 is disclosed by Ayanoglu, et al. in U.S. Pat. No. 5,394,437, entitled HIGH-SPEED MODEM SYNCHRONIZED TO A REMOTE CODEC, which is commonly assigned with the present invention and incorporated herein by reference as if reproduced in its entirety; the principles of the present invention are not, however, limited to a particular means or method of synchronizing the operation of the modem 110 and CODEC 152.

In one embodiment, the central site device 170, which may be referred to as a "digital modem," includes a DSP for receiving digital signals from the digital portion 153 of the PSTN 150, analyzing and/or processing the digital signals, and for transmitting digital signals through the PSTN 150 to be received by client modem 110 (after digital-to-analog conversion by a DAC in mu-law CODEC 152).

The mu-law CODEC 152 conventionally uses 255 non-uniformly spaced quantization intervals, which are closely-spaced for small analog signal values and spread further apart for large signal values, to convert an analog signal received via the analog local loop 151 to digital bit patterns, or "symbols," for transmission over the digital portion 153 of the PSTN to the central site device 170. A DAC in mu-law CODEC 152 may be used to convert symbols received from the central site device 170 to analog signals for transmission over the analog local loop 151 to the client modem 110.

As described hereinafter, the DSP 111 and the CODEC 112 function as "training circuitry" that allows the client modem 110 to iteratively determine the threshold values between the quantization intervals of the ADC in mu-law CODEC 152. In one embodiment, the DSP 111 and the CODEC 112 are also used by the client modem 110 as communication circuitry that employs the iteratively-determined quantization intervals of the ADC in mu-law CODEC 152 to enhance the quality of data communication with the central site device 170.

According to the principles of the present invention, prior to transmitting any data to the central site device 170, the client modem 110 first uses a "training sequence" to iteratively determine the quantization intervals of the ADC in mu-law CODEC 152. By determining the quantization intervals of the ADC in mu-law CODEC 152, the client modem 110 can set the analog signaling levels used by the DAC in its CODEC 112 to fall within the appropriate quantization intervals of the ADC in mu-law CODEC 152; for example, the client modem 110 can set each of its analog signaling levels to fall midway between the upper and lower threshold values for each respective quantization interval of the ADC in mu-law CODEC 152. By determining the actual threshold values for the quantization intervals of the ADC in mu-law CODEC 152, and adjusting the analog signaling levels of the client modem 110 to correspond therewith, the transmission of data from the client modem 110 to the central site device 170 can be optimized.

During the training sequence, the CODEC 112 in the client modem 110 functions as a signal generator to produce a sequence of analog signals, or "probe" signals, in response to digital signals received from the DSP 111. The probe signals are estimates of the ideal values that define the upper and lower thresholds for each quantization interval of the ADC in mu-law CODEC 152. In one embodiment, the CODEC 112 employs pulse amplitude modulation ("PAM") to generate the sequence of analog signals. Those skilled in the art will recognize that other modulation techniques may be employed in the alternative.

When a probe signal is received by the ADC in mu-law CODEC 152, the signal is converted to a digital symbol (or "resulting symbol") that uniquely corresponds to the quantization interval in which the received signal was located; the resulting symbol can then be transmitted over the digital portion 153 of the PSTN 150 to the central site device 170. Upon receiving the resulting symbol, the central site device 170 determines whether the probe signal that produced the symbol is above or below the threshold to be determined, by comparing the resulting symbol with an expected symbol, and generates a return signal which is transmitted back to the client modem 110; the return signal indicates to the client modem 110 whether the actual threshold is above or below the transmitted probe signal.

In one embodiment, the digital return signal generated by central site device 170 is converted by a DAC in mu-law CODEC 152 to an analog signal for transmission over the analog local loop 151 to the client modem 110. The CODEC 112 converts the received analog signal to a digital signal, which is then received by an analyzer circuit which determines whether the probe signal was above or below the actual threshold; in one embodiment, the analyzer circuit is a DSP 111. Based on the analysis of the return signal, the client modem 110 transmits additional probe signals having amplitudes less than or greater than the previous probe signal. In response to return signals generated by the central site device 170 for each successive probe signal, the client modem 110 may generate additional probe signals that iteratively converge on an actual threshold for the quantization interval.

In one embodiment, the client modem 110 successively generates a sequence of probe signals for the thresholds of each quantization interval of the ADC in mu-law CODEC 152, the sequence of probe signals for each threshold being terminated when the client modem 110 determines that the remaining range of uncertainty in the threshold value is within an acceptable predetermined noise margin. In an alternate embodiment, the training sequence may determine the thresholds concurrently.

Those skilled in the art will recognize that the PSTN 150 is typically a full-duplex communications medium, thereby allowing the client modem 110 to transmit and receive analog signals simultaneously. Thus, the client modem 110 may employ a training sequence wherein probe signals for different thresholds may be generated and transmitted sequentially; the order in which return signals are received from the central site device 170 are correlated to the order in which the probe signals are generated. In this manner, the client modem 110 can "multiplex" the determination of the thresholds for all of the quantization intervals of the ADC in mu-law CODEC 152 (i.e., the thresholds are determined substantially concurrently, thereby minimizing the time necessary to determine all of the quantization intervals). Whereas the thresholds of some quantization intervals of the ADC in mu-law CODEC 152 may be relatively close together, those skilled in the art will recognize that it is preferable that the sequence in which probe signals for the thresholds are generated should not be ordered the same as the quantization intervals of the ADC.

Figure 2:
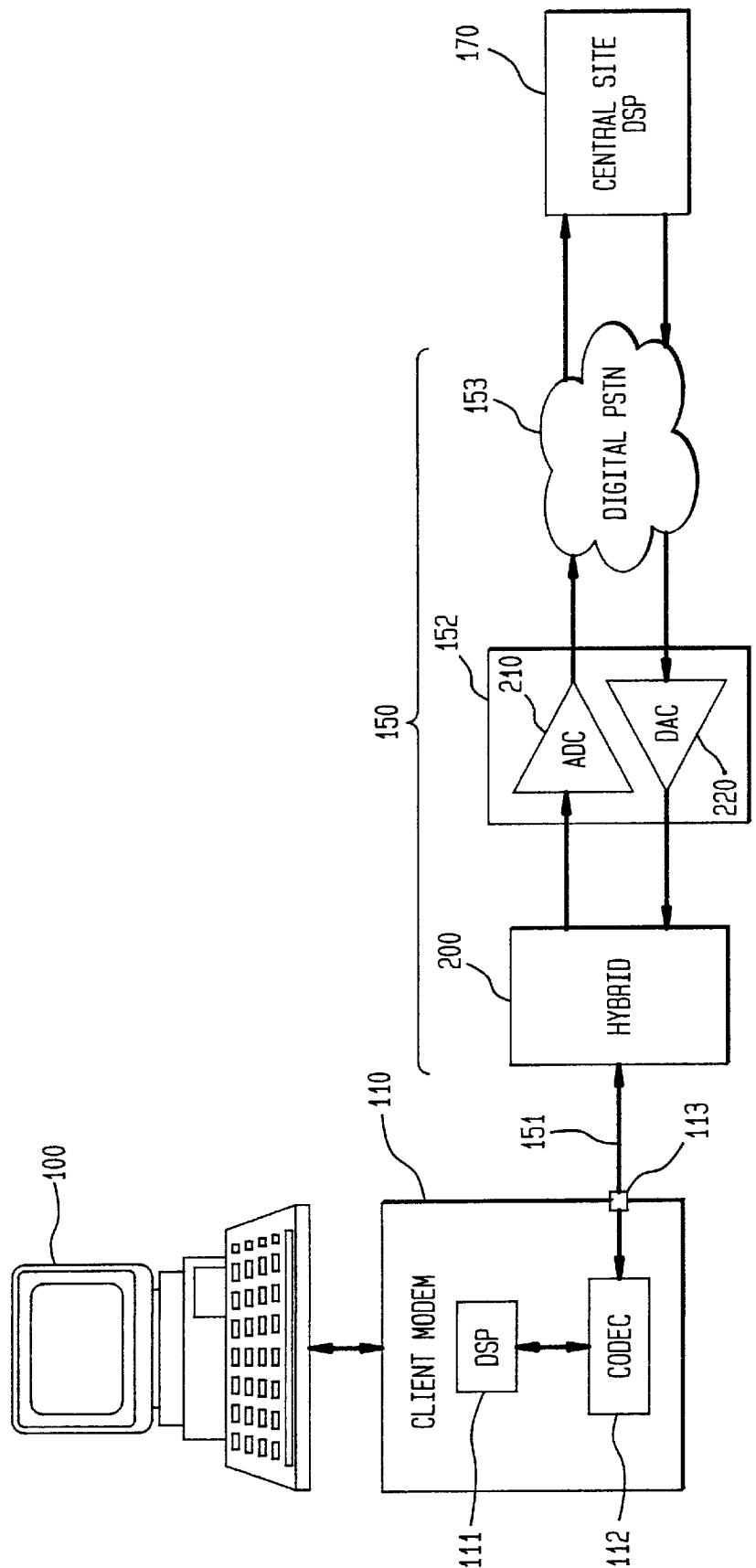
FIG. 2 illustrates a detailed schematic of a modem communicating with a central communications device through a digital telecommunications network.

Turning now to FIG. 2, illustrated is a detailed schematic of a client modem 110 communicating with a central site device 170 through the PSTN 150. The conventional interface for an analog local loop 151 to the digital portion of the PSTN 150 includes a "hybrid" 200, which is a passive device used for converting a dual analog signal (e.g. a conversation between remote telephone users) that is carried on one pair of conductors (i.e. the analog local loop 151) to separate analog signals that are carried on two pairs of conductors. Those skilled in the art will recognize that the principles of the present invention do not depend on the presence of a conventional hybrid in the analog interface to the PSTN 150; the principles of the present invention are suitable for adaptation to other types of analog interfaces including, for example, a DSP that integrates the functions of the hybrid 200 and the CODEC 152.

For data communications, the separate analog signals correspond to the "upstream" and "downstream" (i.e. transmit and receive) data channels for the client modem 110. The upstream channel is converted by an ADC 210 in mu-law CODEC 152 for transmission through the digital portion 153 of the PSTN to the central site device 170, and the digital data (e.g. return signal) transmitted by the central site device 170 is converted by a DAC 220 in CODEC 152 to an analog signal for transmission over the analog local loop 151.

Those skilled in the art are familiar with the problem of "echo" associated with conventional hybrids, which results in the coupling by the hybrid 200 of a portion of the downstream analog signal generated by the DAC 220 into the upstream analog signal received by ADC 210. If a sequence of probe signals is transmitted by client modem 110, the coupling of a portion of the return (i.e. downstream) signal from central site device 170 into the upstream signal, therefore, will result in the central site device 170 receiving probe signals corrupted by an echo signal.

In one embodiment, the client modem 110 and central site device 170 compensate for the presence of an echo signal in the probe signals received by the ADC 210 in mu-law CODEC 152. In one embodiment, during a quiescent period (e.g. when client modem 110 is not transmitting a probe signal), the central site device 170 transmits a signal in the downstream channel and measures the echo signal received in the upstream channel, whereby the central site device 170 learns the echo characteristics of the hybrid 200. The echo characteristics of the hybrid 200 is then communicated by the central site device 170 to the client modem 110, whereby the client modem 110 can estimate the echo signal generated by the hybrid 200 in response to a return signal from the central site device 170. Those skilled in the art are familiar with various techniques used for determining echo path characteristics for purposes of echo cancellation; the principles of the present invention are not limited to either the use of echo cancellation to enhance the determination of the quantization intervals of the CODEC 152, or a particular method of determining the echo characteristics of hybrid 200.

Figure 3:
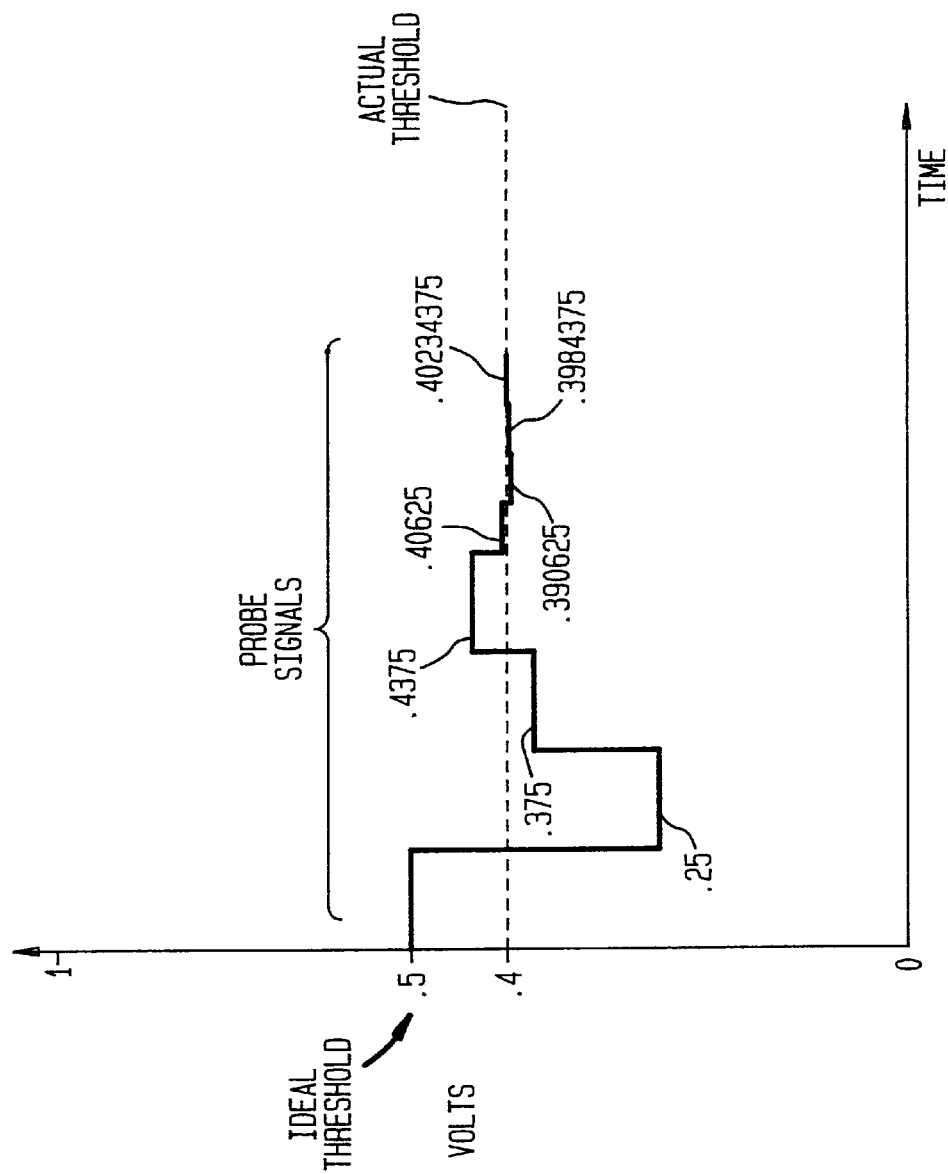
FIG. 3 illustrates a graphical representation of an exemplary iterative process for determining the quantization intervals of an analog-to-digital converter ("ADC") in an analog interface to a digital telecommunications network.

Turning now to FIG. 3, with continuing reference to FIGS. 1 and 2, illustrated is a graphical representation of an exemplary iterative process for determining the quantization intervals of an ADC in mu-law CODEC 152. As noted supra, although each threshold for the quantization intervals of the ADC has an ideal value, the actual thresholds are often slightly different. In one embodiment, using the principles of the present invention disclosed hereinabove, a binary method of convergence is employed to find the actual threshold values. Those skilled in the art should understand, however, that the present invention is sufficiently broad to encompass other convergence methods for finding the threshold values.

For purposes of illustration, it is assumed that a threshold for a quantization interval of an ADC in mu-law CODEC 152 has an ideal value of 0.5 volts, but that the actual value of the threshold may be within the range from 0 to 1 volt. Thus, the first probe signal is preferably 0.5 volts, in response to which the central site device 170 sends a return signal that indicates to the client modem 110 that the probe signal was greater than the actual threshold value of 0.4 volts. The client modem 110 now knows that the actual threshold must lie within the range from 0 to 0.5 volts. Utilizing a binary search algorithm, the client modem 110 determines the mid-point of the range (i.e. 0.25 volts), which is then used for the value of the second probe signal. In response to the second probe signal, the central site device 170 sends a return signal that indicates to the client modem 110 that the probe signal was less than the actual threshold value of 0.4 volts. The client modem 110 can thereby determine that the actual threshold must lie in the range between 0.25 and 0.5 volts, the mid-point of the range (i.e. 0.375 volts) being used for the next successive probe signal. Thus, through an iterative process, the client modem 110 can determine that the actual threshold value is approximately equal to 0.4 volts.

In one embodiment, if an echo is present during the iterative process, the client modem 110 and central site device 170 may compensate for the presence of the echo. For example, using the same ideal and actual threshold values depicted in FIG. 3, assume that a return signal, transmitted by the central site device 170 at the same time that the client modem 110 transmits a probe signal of 0.5 volts, produces an echo equal to 0.1 volts. The echo is coupled by the hybrid 200 into the transmitted probe signal to yield a 0.6 volt signal, which is quantized by the ADC in CODEC 152 to a symbol corresponding to the quantization interval above the actual threshold of 0.4 volts. Having received the echo path characteristics from the central site device 170, as described supra, the client modem 110 can reliably estimate the presence of the 0.1 volt echo that interferes with the probe signal. The client modem 110, however, can only do so after the fact; i.e., after the echo has occurred and the resultant signal (0.6 volts) is quantized by the ADC. Having received the echo path characteristics, however, the client modem 110 can determine that the probe signal of 0.5 volts was distorted to 0.6 volts prior to quantization by the ADC in CODEC 152. Therefore, the client modem 110 can conclude, based on the feedback from the central site device 170, that the actual threshold must lie between zero and 0.6 volts (instead of 0.5 volts, without the echo, as described with reference to FIG. 3). Thus, a subsequent probe signal is preferably the midpoint of the zero to 0.6 volt range; i.e., 0.3 volts, rather than 0.25 volts (without the echo) as illustrated in FIG. 3. Continuing the iterative process, for example, assume that an echo that coincides with the subsequent 0.3 volt probe signal is equal to −0.09 volts; the next iteration range is preferably 0.21 volts (0.3+(−0.09)) to 0.6 volts, and a subsequent probe signal is preferably the midpoint of the range, or 0.405 volts ((0.6−0.21)/2+0.21), rather than 0.375 volts (without the echo) as illustrated in FIG. 3. Continuing the iterative process, if the echo that coincides with the subsequent 0.405 volt probe signal is equal to 0.05 volts, the next iteration range is preferably 0.3 volts to 0.41 volts (0.405+0.05), and a subsequent probe signal is preferably the midpoint of the range, or 0.355 volts ((0.41−0.3)/2+0.3), rather than 0.4375 volts (without the echo) as illustrated in FIG. 3. Those skilled in the art will recognize that, by continuing the iterative process, the probe signal will converge to the actual threshold value (i.e., 0.4 volts), albeit possibly slower in the presence of echo.

Although each of the exemplary probe signals illustrated in FIG. 3 are shown immediately successive to a preceding probe signal, the principles of the present invention are not so limited. Due to signal delays through the PSTN 150, the probe signals generated by client modem 110, and the return signals transmitted by central site device 170, may not be contiguous. Furthermore, as described supra, the thresholds for the quantization intervals of the ADC in mu-law CODEC 152 may be determined either sequentially or concurrently. In one embodiment, the delays in the network are advantageously used to determine the thresholds concurrently. Rather than sending a single probe signal and waiting for a return signal in response thereto, the client modem 110 may employ a training sequence wherein probe signals for different thresholds are generated and transmitted sequentially, the order in which return signals are received from the central site device 170 being correlated to the order in which the probe signals were generated. In this manner, the client modem can "multiplex" the determination of the thresholds for all of the quantization intervals of the ADC in mu-law CODEC 152; i.e. the thresholds are determined substantially concurrently, thereby minimizing the time necessary to determine all of the quantization intervals.

The foregoing has described preferred and alternative features of the present invention that form the subject of the following claims. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

What is claimed is:

1. For use with a central communications device digitally-coupled to a digital telecommunications network having an analog interface thereto, said analog interface including an analog-to-digital converter (ADC), a system for iteratively determining quantization intervals of said ADC, comprising:

a signal generator, coupled to an input of said ADC, that generates a sequence of analog signals to be quantized by said ADC to yield resulting symbols for reception into said central communications device; and an analyzer, that receives a return signal from said central communications device, said return signal indicating comparisons by said central communications device of said resulting symbols with expected symbols, said comparisons allowing said analyzer to determine threshold values between said quantization intervals of said ADC, said quantization intervals being a function of said threshold values.

2. The system as recited in claim 1 wherein said sequence of analog signals is adapted to converge on said threshold values.

3. The system as recited in claim 1 wherein said sequence of analog signals concurrently seeks convergence on multiple threshold values.

4. The system as recited in claim 1 wherein said quantization intervals are distributed non-linearly.

5. The system as recited in claim 4 wherein said quantization intervals are distributed according to mu-law.

6. The system as recited in claim 4 wherein said quantization intervals are distributed according to A-law.

7. The system as recited in claim 1 wherein said signal generator and said analyzer are contained within a modulator/demodulator (MODEM).

8. The system as recited in claim 1 wherein said signal generator employs pulse amplitude modulation (PAM) to generate said sequence of analog signals.

9. The system as recited in claim 1 wherein said analog interface further comprises a hybrid interposed between said ADC and said signal generator, said hybrid introducing an echo of said return signal into said sequence of analog signals, said system compensating for said echo.

10. A method of iteratively determining quantization intervals of an analog-to-digital converter (ADC) in an analog interface to a digital telecommunications network, said network having a central communications device digitally-coupled thereto, said method comprising the steps of:

generating a sequence of analog signals to be quantized by said ADC to yield resulting symbols for reception into said central communications device;

receiving a return signal from said central communications device, said return signal indicating comparisons by said central communications device of said resulting symbols with expected symbols; and determining, with said comparisons, threshold values between said quantization intervals of said ADC, said quantization intervals being a function of said threshold values.

11. The method as recited in claim 10 wherein said step of generating comprises the step of converging said sequence of analog signals on said threshold values.

12. The method as recited in claim 10 wherein said step of generating comprises the step of concurrently seeking convergence of said sequence of analog signals on multiple threshold values.

13. The method as recited in claim 10 wherein said quantization intervals are distributed non-linearly.

14. The system as recited in claim 13 wherein said quantization intervals are distributed according to mu-law.

15. The system as recited in claim 13 wherein said quantization intervals are distributed according to A-law.

16. The method as recited in claim 10 wherein said steps of generating, receiving and determining are performed with a modulator/demodulator (MODEM).

17. The method as recited in claim 10 wherein said step of generating comprises the step of employing pulse amplitude modulation (PAM) to generate said sequence of analog signals.

18. The method as recited in claim 10 wherein said analog interface further comprises a hybrid, said method further comprising the step of compensating for an echo of said return signal introduced by said hybrid into said sequence of analog signals.

19. A modulator/demodulator (MODEM) for communicating with a central communications device digitally-coupled to a digital telecommunications network having an analog interface thereto, said MODEM comprising:

a telephone interface that allows said MODEM to be coupled to said analog interface of said digital telecommunications network, said analog interface including an analog-to-digital converter (ADC);

training circuitry that allows said MODEM to determine characteristics of said digital telecommunications network, said training circuitry having a system for iteratively determining quantization intervals of said ADC, said system including:

a signal generator, coupled to an input of said ADC, that generates a sequence of analog signals to be quantized by said ADC to yield resulting symbols for reception into said central communications device, and an analyzer, that receives a return signal from said central communications device, said return signal indicating comparisons by said central communications device of said resulting symbols with expected symbols, said comparisons allowing said analyzer to determine threshold values between said quantization intervals of said ADC, said quantization intervals being a function of said threshold values; and MODEM communication circuitry that employs said quantization intervals to communicate via said digital telecommunications network.

20. The MODEM as recited in claim 19 wherein said sequence of analog signals is adapted to converge on said threshold values.

21. The MODEM as recited in claim 19 wherein said sequence of analog signals concurrently seeks convergence on multiple threshold values.

22. The MODEM as recited in claim 19 wherein said quantization intervals are distributed non-linearly.

23. The MODEM as recited in claim 22 wherein said quantization intervals are distributed according to mu-law.

24. The MODEM as recited in claim 22 wherein said quantization intervals are distributed according to A-law.

25. The MODEM as recited in claim 19 wherein said signal generator employs pulse amplitude modulation (PAM) to generate said sequence of analog signals.

26. The MODEM as recited in claim 19 wherein said analog interface further comprises a hybrid interposed between said ADC and said signal generator, said hybrid introducing an echo of said return signal into said sequence of analog signals, said MODEM and said central communications device compensating for said echo.

* * * * *